US011724787B2

(12) United States Patent
Wood et al.

(10) Patent No.: US 11,724,787 B2
(45) Date of Patent: Aug. 15, 2023

(54) METHODS AND SYSTEMS FOR DETERMINING A DEPTH OF AN OBJECT

(71) Applicant: Raytheon Company, Waltham, MA (US)

(72) Inventors: Thomas E. Wood, Portsmouth, RI (US); John R. Short, Portsmouth, RI (US)

(73) Assignee: Raytheon Company, Waltham, MA (US)

(*) Notice: Subject to any disclaimer, the term of this patent is extended or adjusted under 35 U.S.C. 154(b) by 980 days.

(21) Appl. No.: 16/534,038

(22) Filed: Aug. 7, 2019

(65) Prior Publication Data

US 2021/0039762 A1 Feb. 11, 2021

(51) Int. Cl.
| B63G 8/08 | (2006.01) |
| B63G 7/08 | (2006.01) |
| B63G 8/00 | (2006.01) |
| G01S 5/02 | (2010.01) |
| G01S 15/89 | (2006.01) |
| G05D 1/06 | (2006.01) |
| B63G 7/00 | (2006.01) |

(52) U.S. Cl.
CPC ............... B63G 8/08 (2013.01); B63G 7/08 (2013.01); B63G 8/001 (2013.01); G01S 5/0294 (2013.01); G01S 15/8981 (2013.01); G05D 1/0692 (2013.01); B63G 2007/005 (2013.01)

(58) Field of Classification Search
CPC . B63G 8/08; B63G 7/08; B63G 8/001; B63G 2007/005; G01S 5/0294; G01S 15/8981; G05D 1/0692
See application file for complete search history.

(56) References Cited

U.S. PATENT DOCUMENTS

| 4,989,186 A | 1/1991 | Ricker | |
| 6,359,833 B1 | 3/2002 | English | |
| 7,417,583 B2* | 8/2008 | Wood | G01S 13/42 |
| | | | 342/123 |
| 7,750,840 B2* | 7/2010 | Wood | G01S 13/726 |
| | | | 342/96 |

(Continued)

FOREIGN PATENT DOCUMENTS

WO WO 2008/105932 9/2008

OTHER PUBLICATIONS

Levine, Radargrammetry, pp. 132-135 from the book published by McGraw-Hill Book Co.; Jan. 1960; 3 Pages.

(Continued)

Primary Examiner — Andrew Polay
(74) Attorney, Agent, or Firm — Daly, Crowley, Mofford & Durkee, LLP (57) ABSTRACT

A method comprising: providing an autonomous vehicle (AV) with a first estimated position of a target; directing the AV to travel toward the first estimated position at a constant velocity; receiving echo signals of transmitted sonar signals, the echo signals indicating a range and an azimuth of the target; determining a depth difference of the AV and the target based on the received echo signals, the depth difference being determined based on changes to the range and azimuth of the target over time; and in response to a depth difference existing, re-directing the AV toward a second estimated position of the target generated from the depth difference.

9 Claims, 7 Drawing Sheets

(56) References Cited

U.S. PATENT DOCUMENTS 9,174,713 B2 11/2015 Item et al.
2014/0012434 A1* 1/2014 Spence ................. G01S 15/872
   701/16
2016/0244135 A1* 8/2016 Farber ..................... B63G 7/02

OTHER PUBLICATIONS

Rong et al., "Survey of Maneuvering Target Tracking. Part V: Multiple-Model Methods;" IEEE Transactions on Aerospace and Electronic Systems, vol. 41, No. 4; Oct. 2005; 67 Pages.
PCT International Search Report and Written Opinion dated Feb. 1, 2021 for International Application No. PCT/US2020/034632; 15 pages.

\* cited by examiner

METHODS AND SYSTEMS FOR DETERMINING A DEPTH OF AN OBJECT

BACKGROUND

Unmanned underwater vehicles (UUVs), such as those used in Mine Countermeasures (MCM), employ sonar for target acquisition and guidance. Such UUVs are designed to be disposable and have a very low cost, given the nature of mission demands. To achieve such low cost, the UUVs generally only employ only a range and azimuth (or "bearing") forward-looking sonar solution.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In general overview, described is a system and technique to determine a depth difference from measurements by a two-dimension (2-D) sonar (e.g. from range and azimuth measurements). Such a system and technique find use, for example, in an autonomous vehicle (AV). For example, such a system and technique may be used to assist in navigating or otherwise directing an AV toward a target.

According to aspects of the disclosure, a method is provided comprising: providing an autonomous vehicle (AV) with a first estimated position of a target; directing the AV to travel toward the first estimated position at a constant velocity; receiving echo signals of transmitted sonar signals, the echo signals indicating a range and an azimuth of the target; determining a depth difference of the AV and the target based on the received echo signals, the depth difference being determined based on changes to the range and azimuth of the target over time; and in response to a depth difference existing, re-directing the AV toward a second estimated position of the target generated from the depth difference.

According to aspects of the disclosure, a method is provided comprising: (a) emitting a transmit signal from a vehicle traveling toward a first position at a constant velocity; (b) receiving a return signal; (c) determining whether a non-zero acceleration value exists between the vehicle and a stationary object by one or a combination of: a doppler measurement; or target range and azimuth measurements; and (d) in response to a non-zero acceleration value existing, re-directing the vehicle to travel toward a second position that is determined from the non-zero acceleration value.

According to aspects of the disclosure, an autonomous vehicle (AV) configured to move toward a target, the AV comprising: (a) means capable of storing a first estimated position of the target; (b) means for directing the AV to travel toward the first estimated position at a constant velocity; (c) means for transmitting a sonar signal; (d) means for receiving echo signals of transmitted sonar signals; (e) means for determining a depth difference between the AV and the target based on the received echo signals; (f) means, responsive to a depth difference existing, for determining a second estimated position of the target generated from the depth difference; and (g) means for re-directing the AV toward the second estimated position of the target.

According to aspects of the disclosure, a method is provided of propelling an autonomous vehicle (AV) toward a target, the method comprising: (a) directing the AV toward a first estimated target position at a constant velocity; (b) transmitting sonar signals toward the first estimated position; (c) receiving echo signals of the transmitted sonar signals; (d) determining a depth difference of the AV and the target based upon the received echo signals; (e) in response to a depth difference existing, determining a second estimated position of the target; and (f) re-directing the AV toward the second estimated target position determined using at least the depth difference.

According to aspects of the disclosure, a system is provided comprising: a transmitter configured to emit a signal from a vehicle traveling toward a first position at a constant velocity; a receiver configured to receive a return signal; a guidance control system processor configured to: determine whether a non-zero acceleration value exists between the vehicle and a stationary object by one or a combination of: a doppler measurement; or target range and azimuth measurements; and in response to a non-zero acceleration value existing, re-direct the vehicle to travel toward a second position that is determined from the non-zero acceleration value.

In one aspect, a method comprises providing an autonomous vehicle (AV) with a first estimated position of a target. The method further includes directing the AV to travel toward the first estimated position at a constant velocity. The method also includes receiving echo signals of transmitted sonar signals with the echo signals providing range and azimuth information. Further, the method includes determining a depth difference of the AV and the target based on the received echo signals and, in response to a depth difference existing, re-directing the AV toward a second estimated position of the target generated from the depth difference.

In embodiments, the method further includes obtaining the first estimated position of the target from a target hunting sonar system. The target can be a mine and the target hunting sonar system can be a mine hunting sonar system.

In additional embodiments, the method can include directing the AV to travel at a first depth based on the first estimated position and directing the AV to travel at a second depth in response to the second estimated position.

In embodiments, the method can comprise re-directing the AV by re-directing the AV to one of, a full-stop hover, a hover and pitch-up, a hover and pitch-down, a hover and move to a higher depth, and a hover and move to a lower depth.

In another aspect, a method comprises emitting a transmit signal from a vehicle traveling toward a first position at a constant velocity and receiving a return signal. The method further comprises determining whether a non-zero acceleration value exists between the vehicle and a stationary object by one or a combination of: a doppler measurement, or target range and azimuth measurements. In response to a non-zero acceleration value existing, the method comprises re-directing the vehicle to travel toward a second position that is determined from the non-zero acceleration value.

In embodiments, the first position is a pre-determined position obtained from a target hunting sonar system. The transmit signal can be a sonar signal and the return signal can be an echo of the transmitted sonar signal.

In additional embodiments, the method can further comprise controlling the vehicle to travel toward the first position at a first constant depth. In other examples, the method can comprise controlling the vehicle to travel toward the second position at a second constant depth.

In further embodiments, the method can comprise determining whether a non-zero acceleration exists by determining a depth difference between the vehicle and the stationary target.

In embodiments, the method can comprise re-directing the AV by re-directing the AV to one of, a full-stop hover, a hover and pitch-up, a hover and pitch-down, a hover and move to a higher depth, and a hover and move to a lower depth.

In yet another aspect, an autonomous vehicle (AV) configured to move toward a target comprises means capable of storing a first estimated position of the target; means for directing the AV to travel toward the first estimated position at a constant velocity; means for transmitting a sonar signal; means for receiving echo signals of transmitted sonar signals; means for determining a depth difference between the AV and the target based on the received echo signals; means, responsive to a depth difference existing, for determining a second estimated position of the target generated from the depth difference; and means for re-directing the AV toward the second estimated position of the target.

In another aspect, a method of directing an autonomous vehicle (AV) toward a target comprises directing the AV toward a first estimated target position at a constant velocity; emitting sonar signals via a two-dimensional (2-D) sonar toward the first estimated position; receiving two-dimensional (2-D) echo signals of the emitted sonar signals; determining a depth difference of the AV and the target based upon the received 2-D echo signals; in response to a depth difference existing, determining a second estimated position of the target; and re-directing the AV toward the second estimated target position determined using at least the depth difference.

In embodiments, the 2-D sonar provides range and azimuth measurements and determining a depth difference between the AV and the target comprises determining a depth difference between the AV and the target utilizing range and azimuth measurements.

In an additional aspect, a system comprises a transmitter configured to emit a signal from a vehicle traveling toward a first position at a constant velocity. The system also comprises a receiver configured to receive a return signal. The system further comprises a processor configured to determine whether a non-zero acceleration value exists between the vehicle and a stationary object by one or a combination of: changes in a plurality of doppler measurements over time, or changes in target range and azimuth measurements over time. In response to a non-zero acceleration value existing, the processor is further configured to re-direct the vehicle to travel toward a second position that is determined from the non-zero acceleration value. In embodiments, the system comprises means for storage of several measurements (e.g. Doppler measurements or range/azimuth measurements) and/or storage/filtering of such measurements over time. In embodiments, such means for storage may be provided as a memory.

In embodiments, the processor can be further configured to determine whether there exists a depth difference between the vehicle and the stationary target that would account for a measured non-zero acceleration when a relative velocity of an AV is controlled to be constant.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
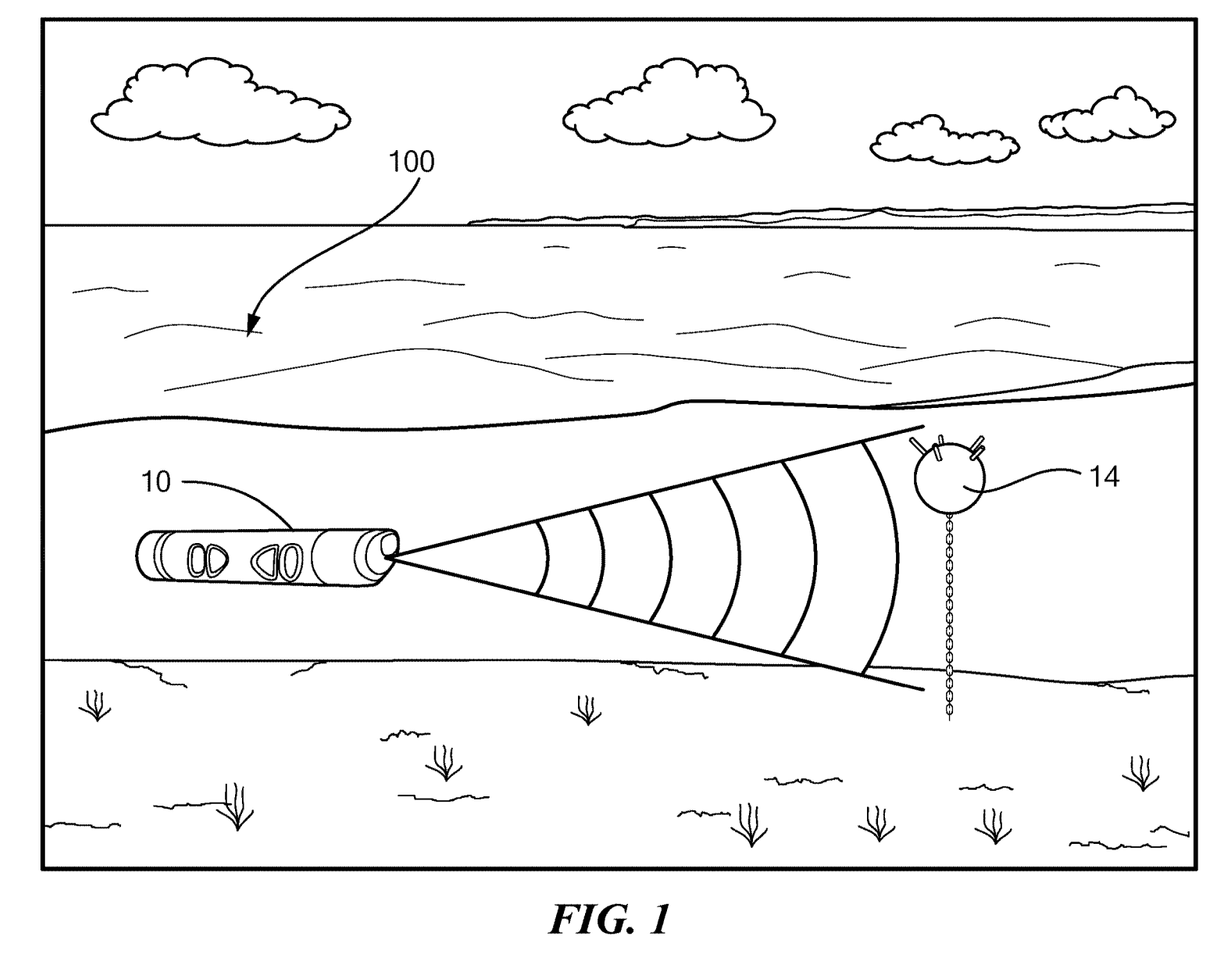
FIGS. 1 and 1A illustrate an environment in which an autonomous vehicle (AV) employs sonar to detect a target and guide the AV to a position for engaging the target.

Referring to FIG. 1, an autonomous vehicle (AV) 10 is traversing an environment 100 in search of a target 14. In this example embodiment, the AV 10 is an underwater AV traversing a body of water 100 (e.g., an ocean) in search of a mine 14. A skilled artisan understands that embodiments of the present disclosure can also be applied to land and air-based search systems using aerial AVs or terrestrial AVs. In some embodiments, the AV 10 may be an unmanned underwater vehicle (UUV).

Figure 2:
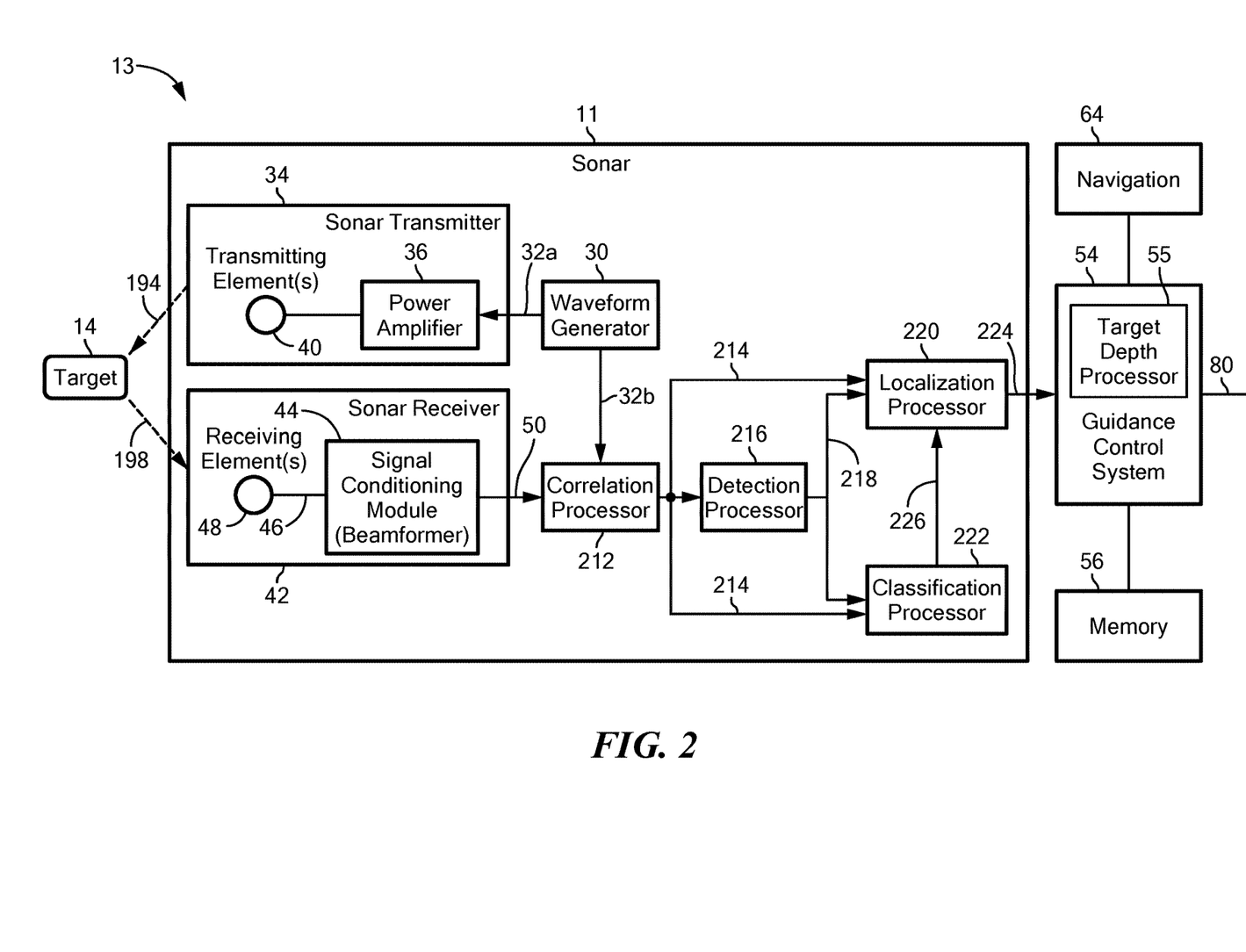
FIG. 2 is a block diagram of target detection and guidance that may be used within an AV.

In embodiments, the AV 10 can be equipped with a sonar system and a guidance control system (e.g., sonar system 11 and guidance control system 54 illustrated in FIG. 2). The sonar system is configured to transmit and receive sonar signals to determine a location of the target 14 using one or more of the techniques described herein. The sonar system can comprise a 2-dimensional (2D) sonar that is configured to determine 2D location information (e.g., range and azimuth), but not depth difference between the AV 10 and the target 14. The 2D sonar may be incapable of determining location information in three dimensions (e.g., range, azimuth, and elevation angle), as would be needed to fully localize the target 14 (e.g., to complete the spherical coordinates of the target 14 relative to the AV 10).

In embodiments, the sonar system can be operatively coupled to a guidance control system (e.g., the guidance control system 54 of FIG. 2) that is configured to process the 2D location information to determine the depth difference between the AV 10 and the target 14. In response to determining the 2D location information and the depth difference, the guidance control system can direct the AV 10 towards the target 14 as described in greater detail herein.

Figure 1A:
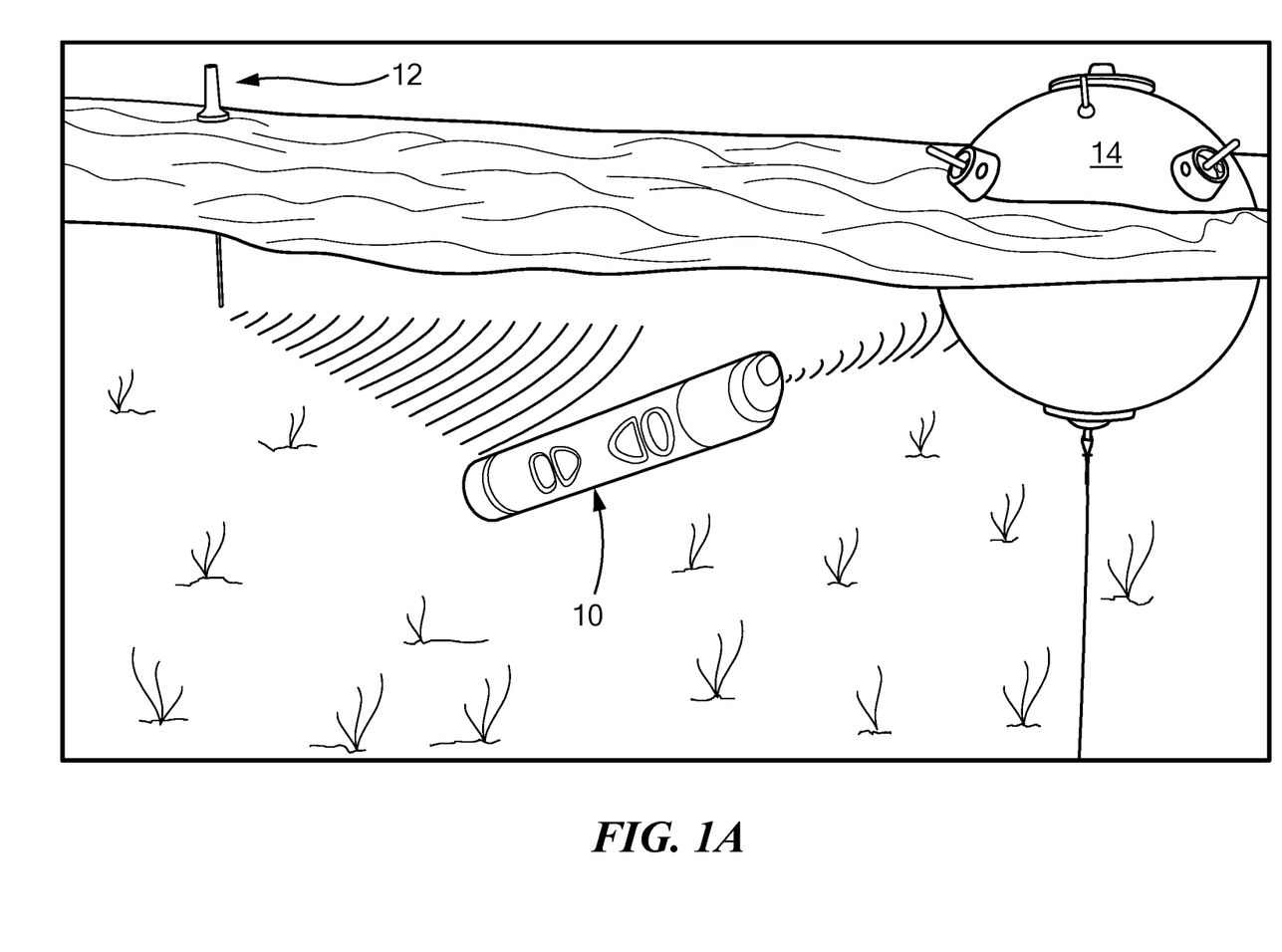

Referring to FIG. 1A, the AV 10 can be tethered to a communication device 12. In embodiments, the AV 10 can be physically or wirelessly tethered to the communication device 12 according to any known or yet to be known technique. The communication device 12 can be a buoy comprising circuitry configured to communicate with the AV 10. In embodiments, the communication device 12 can be in communication with a command center (not shown) from which the communication device 12 receives signals for controlling the AV 10. For example, the signals can include a predetermined estimate of a location of the target 14 such that the AV 10 can begin traversing towards the target 14 from an origin point such as a location of the communication device 12 or an initial location of the AV 10. In embodiments, the AV 10 can be positioned to have an origin point that ensures the target 14 is either above or below the AV 10. For example, the AV 10 can be positioned close to the ocean surface or the ocean floor.

Additionally, the signals can include, but are not limited to, location information, such as geodetic latitude and longitude from the Global Positioning System (GPS) satellites along with range and azimuth information between the communication device 12 and the AV 10. In some implementations, by using the geodetic position of the communication device 12 and the range and azimuth from the AV 10 to the communication device 12, the AV 10 can determine its own location relative to the known target 14 position until that time when the target 14 becomes within range of the sonar on the AV 10. When the target 14 becomes within range of the sonar, detections by the sonar can be communicated from the AV 10 to overseeing operators at a command center for confirmation via the communication device 12. Additionally, the AV 10 can send status information to the command center and receive mission abort commands from the command center via the communications device 12.

Figure 1B:
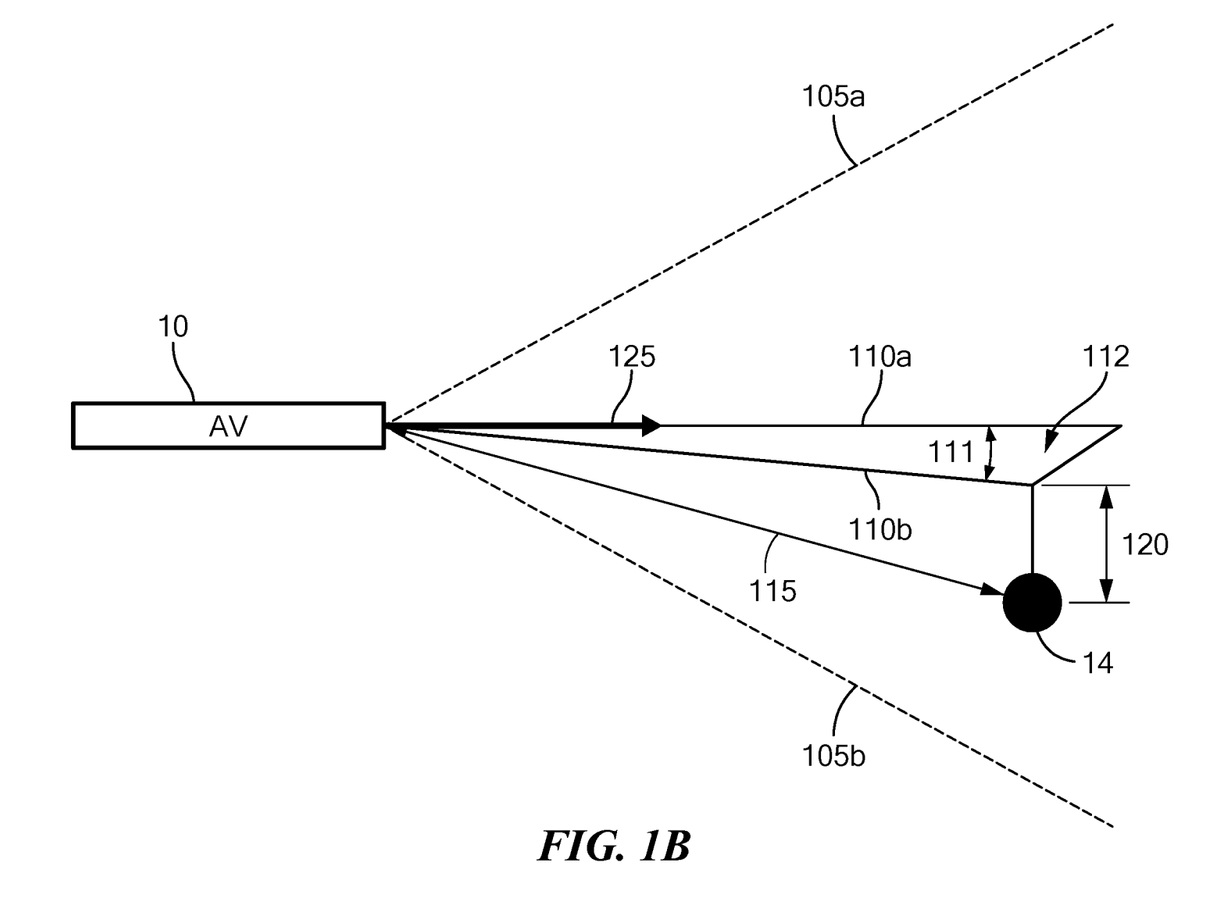
FIG. 1B is a context diagram indicating the geometry of an AV and a target at different depths.

Referring to FIG. 1B, the AV 10 includes a target detection and guidance system (e.g., system 13 of FIG. 2) having 2D sonar (e.g., sonar 11 of FIG. 2) that is configured to transmit and receive sonar signals to determine a location of the target 14. The 2D sonar can include a transmitter and receiver (e.g., transmitter 34 and receiver 42 of FIG. 2). The transmitter and receiver have an upper and lower sensor elevation range 105a-b, which together define a field of view of the sonar. More particularly, the upper and lower sensor elevation range 105a-b describe the space in which the target echo, which results from sonar acoustic signals transmitted by the transmitter (e.g., transmitter 34 in FIG. 2), is likely to be strong enough to be detected over other signals in the background.

The sonar has a boresight 110a representing the direction of greatest sensitivity. In some embodiments, the sonar may have a Mills Cross array configuration and the boresight 110a may be perpendicular to the plane of the Mills Cross array. The boresight 110a is the reference axis for the measurement of azimuth angles to the target 14. In some embodiments, the azimuth angle to the target 14 can be measured using a beamforming process. Beamforming adjusts the signal phase at each element of the receiver array until a maximum target signal amplitude is achieved. In some embodiments, the beamforming process may adjust phases to provide a field of view +/−60 degrees off the boresight 110a. In some embodiments, the sonar can achieve resolution in azimuth of less than one degree depending on the signal to noise ratio.

The 2D sonar can measure range and azimuth of the target 14 on a local level plane 112. The azimuth angle 111 is defined as the angle between the boresight 110a and a line 110b on the local level plane 112 that extends from the AV 10 to the target 14 (i.e., to the position the target 14 would be in on the local level plane 112 if it were projected to the same depth as the AV 10).

Using the 2D location information obtained from the sonar, the AV 10 determines a depth of the target 14 by assuming the target 14 is stationary and by analyzing azimuth angle 111 of the target, the range 115 of the target (also referred to as the "true range" or R), and change of range over time ("range rate"). In embodiments, the AV 10 travels at a constant depth and velocity (as indicated by vector 125) such that range rate measurements can exhibit acceleration of the AV 10 even though the AV 10 travels at the constant depth 125. The range rate measurements can exhibit acceleration because the components of relative velocity which are constant in three dimensions are projected into the local level plane 112 where the change in the line of sight between the AV 10 and the target 14 is not fully measured by the sonar, due to the sonar being unable to measure the difference in depth 120 between the AV and the target. In response to determining range rate, the AV 10 determines a depth difference 120 between the AV 10 and the target 14. Once the AV 10 determines the depth difference 120, the AV 10 determines a direction of depth difference 120 (i.e., up or down). In embodiments, the direction of depth difference 120 can be suggested by operational biases, such as an operational mode of the AV 10 (e.g., shallow search of near-surface mines suggests moving the vehicle down and deep search for volume mines suggests moving the vehicle up), or a pitch of the AV 10 (because target signal strength can change depending upon the pitch of an AV).

Figure 3:
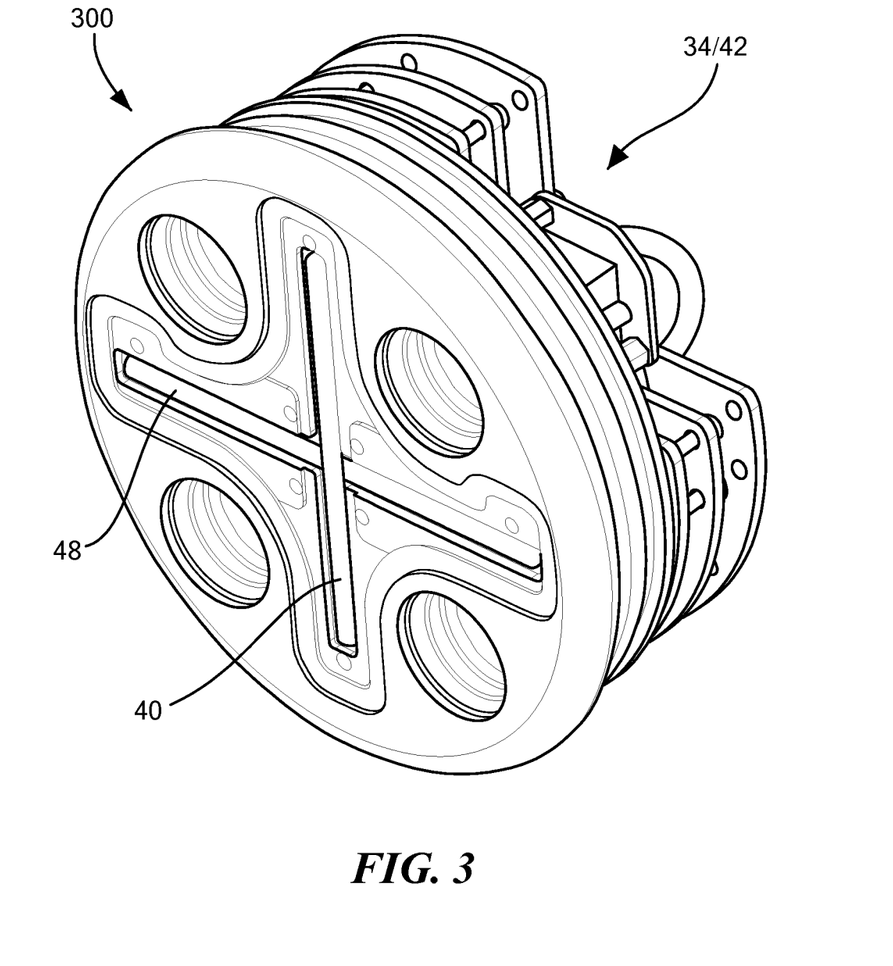
FIG. 3 is an isometric view of a device for obtaining 2D sonar measurements.

FIG. 2 shows an illustrative target detection and guidance system 13 that may be provided on an AV. The system 13 comprises a 2D sonar system 11, navigation sensors 64, a guidance control system 54, and a memory 56. In some embodiments, the sonar 13 may include a waveform generator 30 including circuitry adapted to generate a waveform 32a having a carrier (center) frequency in the high kilohertz range (500-900 KHz), a bandwidth between 9 and 100 KHz and a time duration of a few milliseconds e.g. in the range of 3-10 milliseconds). However, it will be understood that the present disclosure is not limited to any specific type of sonar system. A sonar transmitter 34 is adapted to receive the waveform 32a and to transmit a sound signal 194 into water in accordance with the waveform 32a. The sonar transmitter 34 can include a power amplifier 36 configured to receive the waveform 32a. The power amplifier 36 is coupled to one or more transmitting elements 40 that are adapted to generate the sound signal 194. As illustrated in FIG. 3, in some embodiments, the transmitting elements 40 can be arranged in a Mills Cross array configuration, which allows the transmitting elements to be beamformed to achieve fine azimuthal measurements (see *Principles of Underwater Sound*, Revised Edition, McGraw-Hill, 1975). In other embodiments, the transmitting elements 40 can be arranged in a transmitting sonar array (not shown), and the sound signal 194 is a beamformed sound signal.

The sonar system 11 also includes a sonar receiver 42 adapted to receive a sound signal 198 associated with the transmitted sound signal 194 and to generate a conditioned signal 50 in accordance with the received sound signal 198. The received sound signal 198 may be generated by an echo of the transmitted sound signal 194 from a target 14 (e.g., a mine).

The sonar receiver 42 can include one or more receiving elements 48 adapted to receive the sound signal 198. In some embodiments, the receiving elements 48 are arranged in a receiving sonar array (e.g., as illustrated in FIG. 3). The receiving elements 48 can be coupled to a provide and electronic signals 46 representative of the sound signal 198 to a signal conditioning module 44 adapted to provide a variety of functions, which can include, but which are not limited to, amplification, time varying gain, carrier demodulation, bandpass filtering, and beamforming, and adapted to generate a conditioned signal 50 in conjunction therewith.

The sonar system 11 can also include one or more processors adapted to process the conditioned signal 50. In the embodiment of FIG. 2, the sonar includes a correlation processor 212, a detection processor 216, a localization processor 220, and a classification processor 222. In some embodiments, one or more of the processors 212, 216, 220, 222 can be omitted or combined with one or more of the other processors.

The correlation processor 212 may be coupled to receive the conditioned signal 50 and to provide, as output, a correlation signal 214, which can be coupled to one or more of the other processors, as shown. The correlation processor 212 is adapted to correlate the received waveform 208 with one or more versions 32b of the waveform 32a. In some embodiments, the one or more versions 32b of the waveform 32a can represent a plurality of anticipated Doppler shifts of the received sound signal 198, in accordance with a relative movement between the sonar system 11 and the target 14. The correlation processor 212 provides a correlated waveform 214 accordingly.

The detection processor 216 is adapted to detect the target 14 from the correlated waveform 214 using estimates of signal energy versus noise energy derived from the correlated waveform 214 as a function of time and using thresholds based on pre-established noise models and a constant false alarm rate (CFAR) criteria. A detection signal 218 is provided, which is indicative of a detection of the target 14.

The classification processor 222 is adapted to receive the detection signal 218 and the correlated waveform 214 and is also adapted to provide, as output, a classification signal 226 that is indicative of a type of the target 14.

The localization processor 220 is adapted to receive the detection signal 218 and the correlated waveform 214, and to provide a localization signal 224 that is indicative of a localization of the detected target 14 in range, depth, azimuth angle, and/or depression angle. The localization processor 220 may also be coupled to receive the classification signal 226 and adapted to use signal 226 to generate localization signal 224. For example, localization processor 220 can use the type of target 14, as determined by the classification processor 222, to more accurately locate the target 14. In some embodiments, the localization processor 220 can use the classification signal 226 to eliminate false target contacts determined by detection processor 216.

The guidance control system 54 may be configured to hold vehicle depth and velocity constant during initial search and then to steer towards the target once depth difference and direction are determined. Guidance control system 54 can receive and process the localization signal 224 to steer the AV 10 towards the target 14. Accordingly, the guidance control system 54 includes circuitry configured to send control signals to one or more of the AV's propulsion elements (not shown) to steer the AV 10. The one or more propulsion elements can include any known mechanical element (e.g., one or more propellers) that enables the AV 10 to traverse a body of water (e.g., the ocean 100 of FIG. 1). Various propulsion elements and related techniques that may be employed are described in U.S. Pat. No. 9,174,713 which is herein incorporated by reference in its entirety. As shown in FIG. 2, in some embodiments guidance control system 54 may also be coupled to receive information from navigation sensors 64.

At any convenient time, such as the start of a mission, the AV 10 can receive an initial estimate of the target's location. The AV 10 can receive the initial estimate, for example, via a communications interface 80. The communications interface 80 is configured to communicatively couple with a communications device (e.g., the communications device 12 of FIG. 1A). For example, the communications interface 80 can be a wireless transceiver that enables the AV 10 to engage in bi-directional communications with the communication device. In other examples, the communications interface 80 is configured to couple to a physical tether that is connected to the communications device to enable in bi-directional communications with the communication device via the tether.

Guidance control system 54 can include target depth processor 55 that receives, as input, localized/relative location information of the target 14 and calculates a depth difference of the target using the techniques disclosed herein. In some embodiments, target depth processor 55 implements a depth difference function in hardware, software, or a combination thereof. An illustrative implementation of a target depth processor 55 is shown in FIG. 2B and discussed in detail below in conjunction therewith. The guidance control system 54 can maintain a constant velocity and depth of the AV during an initial search. Then, after the target's depth difference is determined, the guidance control system 54 can use the 3D location of the target (i.e., range, azimuth, and depth) to home in on it.

The guidance control system 54 stores the initial estimate of the target's location (e.g., depth) in a memory 56 (which may or may not be provided as part of the sonar 11). The initial estimate can be in a format such as geodetic latitude, longitude and height above the World Geodetic System 1984 (WGS 84) reference ellipsoid (note that negative height above the ellipsoid is depth in the ocean). Other formats may, of course, also be used. Using the initial estimate, the AV 10 traverses the body of water as discussed in greater detail herein.

In an embodiment, the guidance control system 54 may receive from the communications device 12 an indication of the location of the target 14, while the target 14 is located outside of the detection range of the AV's 10 sonar. At first, the guidance control system 54 may use GPS data relayed by the communications device 12 to navigate the AV 10 towards the target 14. Once the AV 10 is close enough to detect the target 14 by sonar, the range and azimuth sonar measurements can support terminal homing. However, without depth difference measurements, the AV 10 may swim past the target 14 without being on a shot line for firing its neutralizing charge. To avoid bypassing of the target 14, the guidance control system 54 may calculate or otherwise determine using the techniques described herein, depth difference estimates based upon the range and azimuth sonar measurements. The determined depth difference estimates may be used for terminal guidance towards the target 14.

For example, the guidance control system 54 establishes a local coordinate system such as a coordinate system that uses local north, east, down (NED) coordinates. The guidance control system 54 also establishes an initial position of the AV 10 within the coordinate system. In some embodiments, the AV 10 is positioned at a coordinate system origin, for example, (0, 0, 0) in NED. Based on the position of the AV 10 in NED, the guidance control system 54 translates the initial estimate of the target's location from the first format to a second format such as a coordinate in NED with respect to the AV 10. For discussion purposes, the target's location ('T') can be estimated to be T=(667.654, 420.0, 250) in NED.

In response to determining the target's location in NED, the guidance control system 54 controls the AV 10 to move toward the target 14 with a constant velocity ('V') and a constant depth. Thus, at any time ('t'), a position of the AV 10 can be defined as $S(t)=(x_0, y_0, z_0)+Vt$, where $(x_0, y_0, z_0)$ is a starting position of the AV 10 (e.g., (0, 0, 0) in NED). Additionally, a line of sight ('L') between the AV 10 and the target 14 is defined as $L(t)=T-S(t)=L(0)-Vt$, where $L(t)$ is the line of sight at time 't', T is the target's location, L(0) is the line of sight at time '0'. In embodiments, it is assumed that the sonar is moving toward the target from an initially long range and thus, an angle between L(0) and V is small.

As the AV 10 travels towards the target, the sonar processor 52, at periodic times ('t'), measures the range, R(t), and the relative azimuth, β(t), from the AV 10 to the target 14. The sonar processor 52 can include logic and/or an ASIC (application-specific integrated circuit) to calculate range R as a function of time t (denoted R(t)) according to the following equation:

$$R(t) = \sqrt{(x_T - x_0 - v_x t)^2 + (y_T - y_0 - v_y t)^2 + (z_T - z_0)^2} = \sqrt{(L(0) - Vt) \cdot (L(0) - Vt)},$$

in which:
T is the location of the target;
V is the velocity of the AV as it moves toward a target;
Vt is the change in position of the AV over a duration of time t;
$x_o$ is a first coordinate of an initial (or starting) position of an AV;
$x_T$ is a first coordinate of a target position;
$v_x$ is the velocity in the X direction of the AV on a Cartesian coordinate system as the AV moves toward a target;
$y_0$ is a second coordinate of an initial (or starting) position of an AV;
$y_T$ is a second coordinate of a target position;
$v_y$ is the velocity in the Y direction of the AV on a Cartesian coordinate system as the AV moves toward a target;
$z_o$ is a third coordinate of an initial (or starting) position of an AV;
$z_T$ is a third coordinate of a target position (It should be noted that $z_T$ is not determined by sonar measurement and that, in the processing approach described, a plurality of hypotheses may be used whereby R(t) is filtered for each hypothesis); and
L(t) is a line of sight between the AV and target at time t.

Additionally, the sonar processor 52 can include logic and/or an ASIC to calculate β(t) according to the following equation:

$$\beta(t) = \tan^{-1}\left(\frac{y_T - y_0 - v_y t}{x_T - x_0 - v_x t}\right) - \tan^{-1}\left(\frac{v_y}{v_x}\right),$$

In response to determining the relative azimuth, the sonar processor 52 can include logic and/or an ASIC to calculate true azimuth (i.e., azimuth (a)) by adding the AV's course over ground, ξ, to the relative azimuth according to the following equation:

$$\alpha(t) = \beta(t) + \xi = \tan^{-1}\left(\frac{y_T - y_0 - v_y t}{x_T - x_0 - v_x t}\right),$$

In which:
α(t) is a true azimuth position (i.e., the angle from North to the target location with vertex at the sonar) of an AV at time t;

β(t) is a relative azimuth (i.e., the angle from the sonar velocity vector to the target) from the AV to the target at time t; and ξ is the AV's course over ground.

Upon determining true azimuth, the sonar processor 52 provides the localization signal 224, which includes the range, relative azimuth, and true azimuth calculations to the guidance control system 54. Using the localization signal 224, the guidance control system 54 determines range rate, $\dot{R}(t)$, according to the following equation:

$$\dot{R}(t) = \frac{-V \cdot (L(0) - Vt)}{R(t)} = \frac{\|V\|^2 t - V \cdot L(0)}{R(t)} = \frac{\|V\|^2 t - \|V\| \cdot \|L(0)\| \cos(\theta)}{R(t)},$$

In which:
$\dot{R}(t)$ is the range rate;
'θ' is the cone angle between the velocity of the AV 10 and the initial line of sight to target 14; and
∥V∥ is the velocity of the AV (i.e. the norm of the AV velocity).

Using the range rate, the guidance control system 54, using target depth processor 55, determines a depth difference (also denoted herein as |dz|) between the AV 10 and the target 14. In embodiments, the AV 10 can have an initial position with a long range from the target 14. In such instances, the range rate can be a poor discriminant of depth difference because the cone angle 'θ' is very small for all reasonable values of the depth difference. In some embodiments, the guidance control system 54 can generate a graph, similar to graph 200 depicted in FIG. 2A, showing how target range can vary over time under a plurality of initial hypotheses of depth difference between an AV traveling with constant velocity and a stationary target.

Figure 2A:
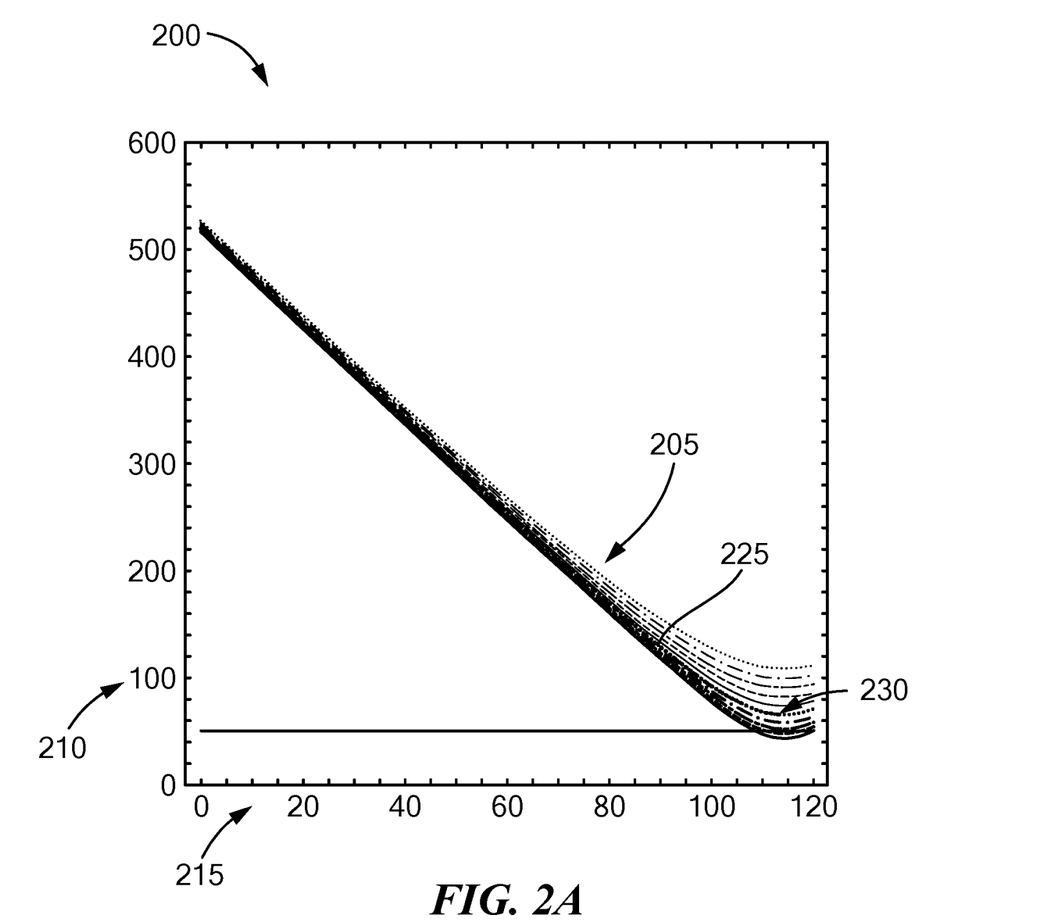
FIG. 2A is a graph showing how target range curves can vary over time under a plurality of initial hypotheses of depth difference between an AV traveling with constant velocity and a stationary target.
Figure 2B:
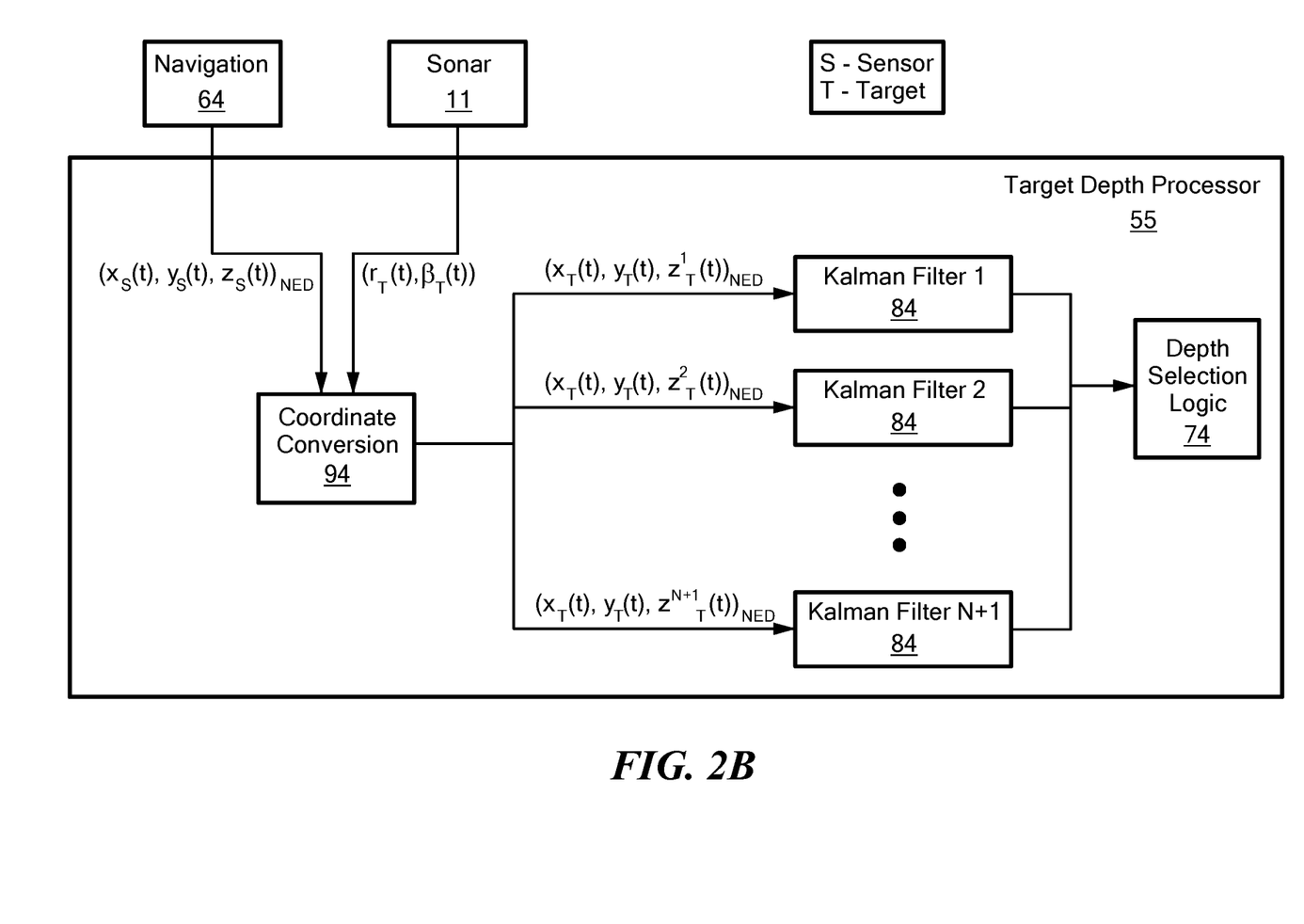
FIG. 2B is a block diagram of a system for processing two-dimensional (2D) sonar measurements to determine the location of a target in three-dimensional (3D) coordinates.

Regarding FIG. 2A, the graph 200 includes a plurality of curves, such as curves 205, 225, and 235. Each curve in FIG. 2A depicts how sonar range measurements would change with time if the actual depth of the target 14 differed from the depth of the AV 10 by an assumed amount. The multiplicity of curves reflects the multiple hypotheses for the depth difference of the target 14. The lower curve 225 depicts the range over time if the depth difference is relatively small (e.g., zero or close to zero). The upper curve 205 depicts the range over time if the depth difference is relatively large. The dotted curve 230 represents the actual range measurements which are used to select a depth difference estimate based on the best fit of the measurements to one of the curves in the collection. In FIG. 2A, the horizontal axis 215 represents time (e.g. in seconds) and the vertical axis 210 represents range (e.g. in meters).

The guidance control system 54 generates curves 205 by hypothesizing different depths spaced at, e.g., 10 units apart. In this illustrated example, the measurements 225 align with the additional curves 205 at a depth difference, |dz|, of 50. The dotted curve 230 of actual range measurements over time is best fitting to the fifth curve up from bottom. With spacing of 10 units per hypothesis, the depth difference, |dz|, is close to 50. Note that in the present example, the curves 205, 225, and 230 indicate that the target 14 is at an azimuth off of the direction of travel. In particular, if the target were on the vehicle's course and at the same depth, curve 225 would have a minimum value at 0 (because the minimum of curve 225 corresponds to the closest point of approach when the vehicle and target are at the same depth, i.e. |dz|=0).

Such positioning of the target 14 would require the AV 10 to change its depth, and also turn, in order to intercept the target 14.

Referring back to FIG. 2, once the depth difference is determined, the guidance control system 54 determines a direction of the depth difference (i.e., whether the target 14 is above or below the AV 10). In embodiments, a true starting depth of the AV 10 can be close to the surface of the body of water or close to a floor of the body of water to ensure that the target 14 is either below or above the AV 10. In other embodiments, the guidance control system 54 may determine the direction of the depth based on the pitch of the AV. For example, if the AV 10 pitches up and the target signal is stronger, the AV guidance will travel up to the depth of the target. Otherwise, the AV 100 will travel down to the target.

FIG. 2B shows an example of a target depth processor 55, according to some embodiments. The processor 55 can process 2D sonar measurements, compensated for vehicle motion by navigation sensors and converted to 3-dimensional Cartesian coordinates, under a plurality of depth difference hypotheses. Under each of these hypotheses a noise reduction (Kalman) filter may be applied. A depth selection logic can select the hypothesis of depth difference that minimizes the filter residual (difference between expected values and sensor measurements).

The illustrative target depth processor 55 may include a multi-model filter, here comprised of one or more filters 84. The multiple models correspond to distinct depth difference assumptions. Depth Selection Logic 74 eliminates the filters with larger "residual." The filters 84 also remove noise that may be introduced by sensors such as a sonar 11 or a navigation sensor 64. The sensors 11, 64 can introduce noise due to variations in the environment, including temperature effects on the speed of sound, quantization noise on measurements, and numerical noise in algorithms implemented by a digital computer.

In embodiments, the target depth processor 55 includes a coordinate conversion processor 94 that receives navigation information from the navigation sensor 64 and sonar information from the sonar system 11. The navigation information can include a velocity and position of the AV 10 and the sonar information can include a localization of the target 14 in range, and in azimuth angle. Notably, the sonar system 11 is provided as a two-dimensional sensor which does not measure depth or elevation angle directly. However, as discussed above, the sonar system 11 may derive or otherwise determine an estimate of the depth difference based upon two-dimensional measurements. For example, a depth difference may be determined based upon range and azimuth angle measurements and/or range and azimuth measurements.

Using the navigation information and the sonar information, the coordinate conversion processor 94 generates several hypotheses of a depth of the target and corresponding presumed fixed positions of the target in NED. Each of the depth hypotheses can be integer multiples of a desired depth resolution, with a number of hypotheses selected to cover a likely depth error in a given location of the target 14.

In embodiments, each of the hypothesized depths is provided to the multi-model filter, which in this example, is comprised of Kalman filters 84. In other words, a Kalman filter is run for each of the hypothesis. Each Kalman filter 84 generates a state mean vector, $X^i(n)$, and covariance matrix, $P^i(n)$ after each measurement of the sensors 11, 64.

Using the generated state mean vectors and covariance matrix, a depth selection logic processor 74 coupled to the filters 84 determines a magnitude of difference between the hypothesized target location and filtered states according to the equation:

$$\text{Residual}(i) = \|T^i - X^i(n)\|,$$

In which i is an index representing the filter that is being processed

Residual(i) is a magnitude of difference between the hypothesized target location and filtered states;

n is the time index of the filter output;

$T^i$ is the hypothetical target location used in the $i^{th}$ filter $X^i(n)$ is the $i^{th}$ filter state mean vector after the $n^{th}$ iteration of the filter The depth difference is determined to be the value of $(N-1)|dz|$, where 'N' is an index of a minimum Residual, and $|dz|$ is the amount of depth difference used to change from one hypothesis to the next.

The multi-model Kalman filter is thus configured to find a best fit of range and azimuth measurements to one of a plurality of hypothesis curves, each of the hypothesis curves being configured to model changes in sonar range measurements that are expected to occur for a given depth difference between an AV and a target. That is, Kalman filtering is used in both target tracking and motion model selection by filtering for state estimation (e.g. velocity or acceleration states) of states that are not sensed directly.

Using the depth difference, the guidance control system 54 (FIG. 2) steers the AV 10 towards the target 14. In embodiments, the guidance control system 54 steers the AV 10 towards the target 14 to neutralize the target 14 where the target 14 is an enemy mine or other enemy threat. For example, the guidance control system 54 can cause the AV 10 to perform one or more of the following navigation tasks: a full-stop hover, a hover and pitch-up, a hover and pitch-down, a hover and move to a higher depth, and a hover and move to a lower depth. Once the AV 10 is in close proximity to the target 14, the guidance control system 54 can cause the AV 10 to detonate to destroy the target 14.

It should be appreciated that in some embodiments, some or all of the target depth processor 55 may be provided as part of a guidance control system (e.g. guidance control system 54 of FIG. 2) while in other embodiments, some or all of the target depth processor 55 may be provided as part of a sonar (e.g. sonar 11).

FIG. 3 shows an example of device 300 for obtaining 2D sonar measurements. The illustrative device 300 may be positioned, for example, at the "nose" of an AV (e.g., AV 10 of FIG. 1). The device 300 can include (or "house") a sonar array 40, 48 in addition to transmitter 34 and receiver 42 electronics located immediately behind the array 40, 48. In this example, the array 40, 48 is arranged in a Mills Cross array configuration suitable for accurate range and azimuth measurements on a target. The device 300 may be provided as a compact package appropriate for disposable applications, such as Mine Countermeasures (MCM) vehicles.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Processes can be performed by one or more programmable processors executing a computer program to perform functions of the embodiments described herein by operating on input data and generating output. Processes can also be performed by an apparatus can be implemented as special purpose logic circuitry. The circuitry can, for example, be an FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed processing system (i.e. a processing system which includes a plurality of processors and may include, for example, a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
    providing an autonomous vehicle (AV) with a first estimated position of a target;
    directing the AV to travel toward the first estimated position at a constant velocity;
    receiving, from a 2-dimensional sensor of the AV, echo signals of transmitted sonar signals, the echo signals indicating a range and an azimuth of the target;
    measuring range of the target over time using from the echo signals;
    for each of a plurality of candidate depth differences, generating data corresponding to a change in range of the target over time that would be expected if the AV and the target had the candidate depth difference;

determining a depth difference of the AV and the target as the one of the plurality of candidate depth differences for which the generated data has a best fit to the measured change in range of the target over time; and in response to a depth difference existing:

determining a direction of the depth difference, the direction indicating whether the target is above or below the AV, and re-directing the AV toward a second estimated position of the target generated from the depth difference and the direction of the depth difference.

2. The method of claim 1 further comprising obtaining the first estimated position of the target from a target hunting sonar system.

3. The method of claim 2, wherein the target is a mine and the target hunting sonar system is a mine hunting sonar system.

4. The method of claim 1 further comprising:

directing the AV to travel at a first depth based on the first estimated position; and directing the AV to travel at a second depth in response to the second estimated position.

5. The method of claim 1, wherein the depth difference is determined by using a multi-model Kalman filter.

6. The method of claim 5, wherein the multi-model Kalman filter is configured to find the best fit between the data generated for the plurality of candidate depth differences and the measured range of the target over time.

7. The method of claim 5 wherein determining the depth difference of the AV and the target comprises determining whether a non-zero acceleration value exists between the vehicle and a stationary object by one or a combination of:

a doppler measurement; or target range and azimuth measurements.

8. The method of claim 1, wherein determining the direction of the depth difference comprises:

pitching the AV up or down;

determining whether the echo signals are stronger following the pitching; and determining the direction of the depth difference based on whether the echo signals are stronger.

9. The method of claim 1, wherein directing the AV to travel toward the first estimated position comprises directing the AV to travel toward the first estimated position at the constant velocity and at a constant depth, the constant depth selected to bias the AV above or below the target; and wherein the determining of the direction of the depth difference comprises determining the direction of the depth difference according to said biasing.

* * * * *